United States Patent

[11] 3,598,203

| [72] | Inventor | Earl J. Donaldson |
| | | China Lake, Calif. |
| [21] | Appl. No. | 803,765 |
| [22] | Filed | Mar. 3, 1969 |
| [45] | Patented | Aug. 10, 1971 |
| [73] | Assignee | The United States of America as represented by the Secretary of the Navy |

[54] SPRING APPLIED, ELECTRIC RELEASED BRAKE
1 Claim, 2 Drawing Figs.

| [52] | U.S. Cl. | 188/171, 188/72.3 |
| [51] | Int. Cl. | B60t 13/04 |
| [50] | Field of Search | 188/166, 170, 171, 173, 71.4, 72.3 |

[56] References Cited
UNITED STATES PATENTS

| 688,670 | 12/1901 | McGeorge | 188/171 |
| 1,932,970 | 10/1933 | Howe | 188/166 X |
| 3,124,219 | 3/1964 | Lee | 188/173 |
| 2,983,339 | 5/1961 | Neff | 188/72.3 X |

Primary Examiner—George E. A. Halvosa
Attorneys—Edgar J. Brower and Roy Miller

ABSTRACT: A rotary motion brake comprising two spring-loaded parallel plates which are separated by means of a cam capable of turning to permit the plates to come together to cage a disc placed therebetween. The operation of the cam is controlled by solenoid means.

PATENTED AUG 10 1971  3,598,203

INVENTOR.
EARL J. DONALDSON
BY
ROY MILLER
ATTORNEY.

SPRING APPLIED, ELECTRIC RELEASED BRAKE

GOVERNMENT INTEREST

The invention described herein may be manufactured and used by or for the Government of the United States of America for governmental purposes without the payment of any royalties thereon or therefor.

BACKGROUND OF THE INVENTION

In many applications it is desirable to cage an electrical motor in random rotational positions by means of a disc brake, without impulse shock to the motor.

SUMMARY OF THE INVENTION

The present invention relates to spring applied electrically released brakes of the type that are particularly suitable for use with gyro torquer motors, wherein the brake is applied automatically when the current is off and a solenoid is energized to release the brake.

In accordance with the present invention two spring-loaded parallel plates are separated by means of a cam. The cam is capable of turning to permit the parallel plates to come together to cage a disc placed between the plates. The operation of the cam is controlled by solenoid means.

DESCRIPTION OF THE PREFERRED EMBODIMENT

Figure 1:
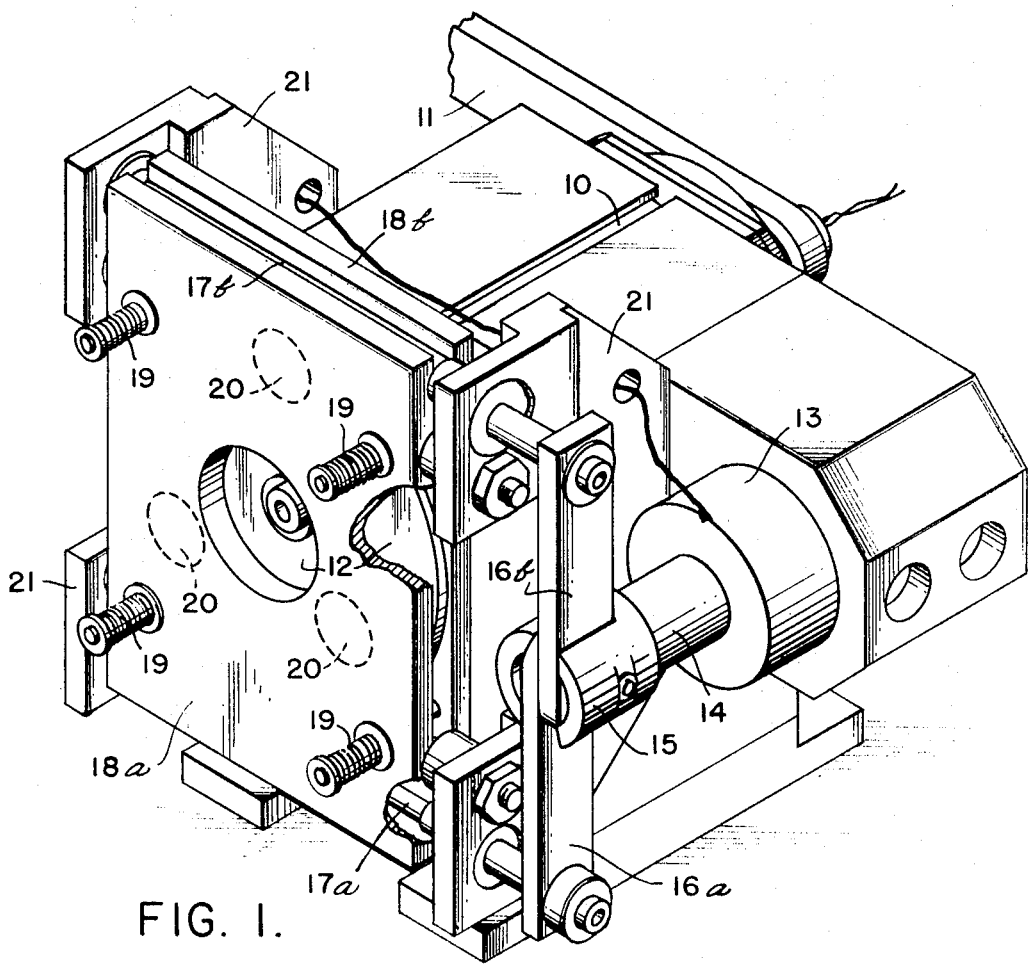
FIG. 1 is an isometric view of a preferred embodiment of the invention.
Figure 2:
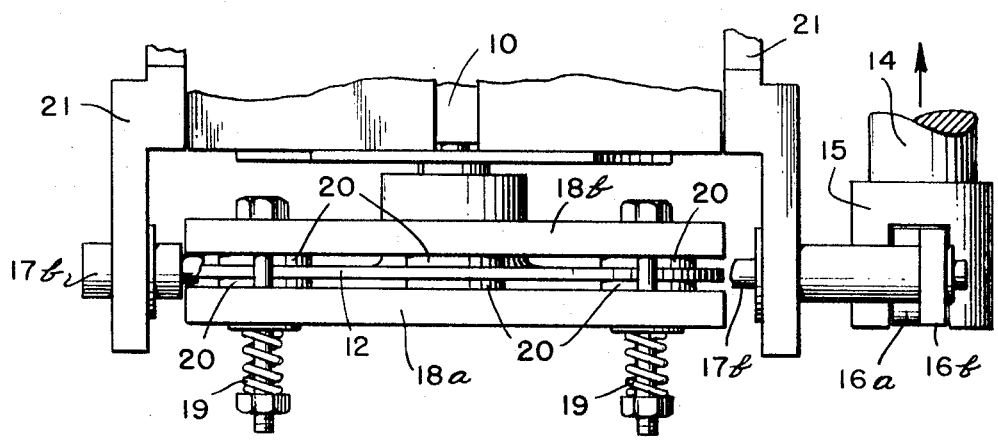
FIG. 2 is a top view of a preferred embodiment of the invention.

Referring to the drawing, torquer motor 10 turns torquer arm 11 and disc 12. It is desired to cage the disc and torquer arm when no current is applied to solenoid 13.

When current is applied to solenoid 13 the solenoid pulls in plunger 14 and operates left crank arm 16a and right crank arm 16b through yoke 15. The crank arms simultaneously turn identical cam shafts 17a and 17b forcing plates 18a and 18b apart. Plates 18a and 18b are forced together by springs 19. Thus, when solenoid 13 is deenergized, springs 19 force the plates together and brake lining pads 20 stop the disc from rotating and cage torquer motor 10.

Pads 20 may be made of any suitable brake lining material and applied to plates 18a and 18b by epoxy cement or other bonding means. Springs 19 are equally biased so that plates 18a and 18b are kept as parallel as practical.

The plates are mounted on plate mounts 21 which are attached to torquer motor 10.

What I claim is:

1. A rotary motion brake consisting of:
    a rotary shaft;
    a disc fixed to said shaft;
    a rectangular plate, having a centrally located circular cutout portion and a smaller circular cutout portion located adjacent each of the four corners of said plate, on each side of, and in complete covering relationship to, said disc, wherein each of said cutout portions in one of said plates is disposed in alignment with the respective cutout portion in the other of said plate, and each of said plates is movable toward and away from said disc but held from rotation therewith;
    spring biasing means located adjacent each of said four corners of said rectangular plates wherein each of said spring biasing means consists of a bolt disposed through one of said smaller cutout portions in each of said plates, a coil spring slideably mounted on said bolt, and a nut for retaining said spring on said bolt, wherein the head of said bolt abuts one of said plates and said spring abuts the other of said plates, such that said plates are biased toward one another;
    a pair of cam means for forcing said plates apart against the action of said springs so that said plates move apart parallel to said disc, comprising a pair of cams located at the upper and lower edges of, and disposed between, said plates, a crank arm coupled to each said cam, a yoke coupled to said crank arms, a plunger coupled to said yoke, and a solenoid coupled to said yoke; and
    three brake pads equally spaced and fastened to each plate so that the disc will be clamped between three pairs of oppositely disposed pads;
    such that said disc may be caged in any position.